(12) United States Patent
Kulack et al.

(10) Patent No.: US 8,538,976 B2
(45) Date of Patent: Sep. 17, 2013

(54) ABSTRACT DATA MODEL EXTENSION THROUGH MANAGED PHYSICAL STATEMENT STRUCTURES

(75) Inventors: Frederick A. Kulack, Rochester, MN (US); John E. Petri, St. Charles, MN (US); Humberto R. Rivero, Rochester, MN (US)

(73) Assignee: International Business Machines Corporation, Amonk, NY (US)

( * ) Notice: Subject to any disclaimer, the term of this patent is extended or adjusted under 35 U.S.C. 154(b) by 171 days.

(21) Appl. No.: 13/026,377

(22) Filed: Feb. 14, 2011

(65) Prior Publication Data

US 2012/0209869 A1  Aug. 16, 2012

(51) Int. Cl.
*G06F 17/30* (2006.01)
*G06F 7/00* (2006.01)

(52) U.S. Cl.
USPC ............................ 707/759; 707/769; 707/771

(58) Field of Classification Search
None
See application file for complete search history.

(56) References Cited

U.S. PATENT DOCUMENTS

| | | | |
|---|---|---|---|
| 6,996,558 | B2 | 2/2006 | Dettinger et al. |
| 7,054,877 | B2 | 5/2006 | Dettinger et al. |
| 7,461,052 | B2 | 12/2008 | Dettinger et al. |
| 2004/0225641 | A1 * | 11/2004 | Dettinger et al. ................. 707/3 |
| 2006/0136407 | A1 * | 6/2006 | Dettinger et al. ................. 707/4 |
| 2008/0189289 | A1 * | 8/2008 | Dettinger et al. ............... 707/10 |
| 2009/0106294 | A1 * | 4/2009 | Gutlapalli et al. ............ 707/102 |

\* cited by examiner

*Primary Examiner* — Sangwoo Ahn
(74) *Attorney, Agent, or Firm* — Patterson & Sheridan, LLP

(57) ABSTRACT

A method and system for integrating a physical query statement in a data abstraction model comprising a plurality of logical fields are provided. The method involves receiving the physical query statement and parsing the physical query statement to provide physical fields. The next step is determining whether the physical fields can be directly mapped to logical fields in the data abstraction model to yield a first determination result. Following this step, if at least one first physical field cannot be directly mapped to logical fields in the data abstraction model, then the next step is determining whether the first physical field can be determined from fields in the data abstraction model to yield a second determination result. Finally, the method involves providing a representation of the first determination result and a representation of the second determination result.

18 Claims, 10 Drawing Sheets

ABSTRACT DATA MODEL EXTENSION THROUGH MANAGED PHYSICAL STATEMENT STRUCTURES

BACKGROUND

This disclosure is generally related to database systems and particularly related to techniques for extending an abstract data model through managed physical statement structures.

Databases are well known in the art. One type of database is a relational database, which matches data by using common characteristics found within the data set. Relational databases store data in tables comprising rows and columns containing related information. Users access relational databases via programmatic commands using programming languages, such as SQL. For example, consider a database table with columns for names, social security numbers and birthdates of the patients in a hospital. In such a case, an SQL statement could filter patients by birthday. For example, a query could be composed which retrieved the names of patients who were born between 1930 and 1940. Another SQL statement could use data derived from the birthdates. For example, this command could be used to select a group of patients whose age is between 70 and 80.

The programming language command based method of accessing a database is inefficient because, as a result, only people with a programming or information technology background could access the database. If a researcher without such a background needed information from the database, she would have to ask a database administrator or other IT person in the office to provide the information to her.

Databases are often large, complex software applications that require specialized training to use or administer properly. Because of this complexity, database abstraction techniques have been developed that provide an abstraction layer between an underlying physical representation of data (used by the physical database) and an abstraction layer presented to users interacting with the database. For example, commonly assigned U.S. Pat. No. 6,996,558 (the '558 patent) entitled "Application Portability and Extensibility through Database Schema and Query Abstraction," discloses techniques for constructing a data abstraction model over an underlying physical database. The '558 patent discloses a data abstraction model constructed using logical fields that map to data stored in the underlying physical database. The definition for each logical field includes an access method specifying a location (i.e., a table and column) in the underlying database from which to retrieve data. Users compose an abstract query by selecting logical fields and specifying conditions.

Abstract query based systems allow users to compose queries more easily using intuitive interfaces that do not require detailed knowledge of a particular query language (e.g., SQL). However, businesses may have a large library of pre-existing SQL-based queries, and would like to integrate this library of SQL-based queries with an abstract database system. Each such query, in effect, defines a table generated from the then existing data in the database when the query is executed. Because such a table is generated when the query is executed, it is not part of the underlying relational database schema used to define the abstract query based system.

SUMMARY

One embodiment of the invention includes a computer-implemented method of integrating a physical query statement in a data abstraction model comprising a first plurality of logical fields used to expose an underlying physical database. The method may generally include parsing the physical query statement to identify one or more output fields specified by the physical query statement, mapping at least a first one of the output fields of the physical query statement to a first one of the plurality of logical fields provided by the data abstraction model; and generating at least a first logical field for a second one of the output fields. The first logical field includes an access method mapping the first logical field to the second one of the output fields.

In a particular embodiment, this method may further include generating at least a second logical field having an access method mapping the second logical field to a third one of the output fields in the physical query statement, replacing at least one logical field of the plurality of logical fields with the generated second logical field, and providing a query interface to compose abstract queries.

Another embodiment includes a computer-readable storage medium storing an application, which, when executed on a processor, performs an operation for integrating a physical query statement in a data abstraction model comprising a first plurality of logical fields used to expose an underlying physical database. The operation may generally include parsing the physical query statement to identify one or more output fields specified by the physical query statement, mapping at least a first one of the output fields of the physical query statement to a first one of the plurality of logical fields provided by the data abstraction model, and generating at least a first logical field for a second one of the output fields, wherein the first logical field includes an access method mapping the first logical field to the second one of the output fields.

Yet another embodiment of the invention includes a system having a processor; and a memory storing an application program, which, when executed on the processor, performs an operation for integrating a physical query statement in a data abstraction model comprising a first plurality of logical fields used to expose an underlying physical database. The operation may generally include parsing the physical query statement to identify one or more output fields specified by the physical query statement, mapping at least a first one of the output fields of the physical query statement to a first one of the plurality of logical fields provided by the data abstraction model, and generating at least a first logical field for a second one of the output fields, wherein the first logical field includes an access method mapping the first logical field to the second one of the output fields.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
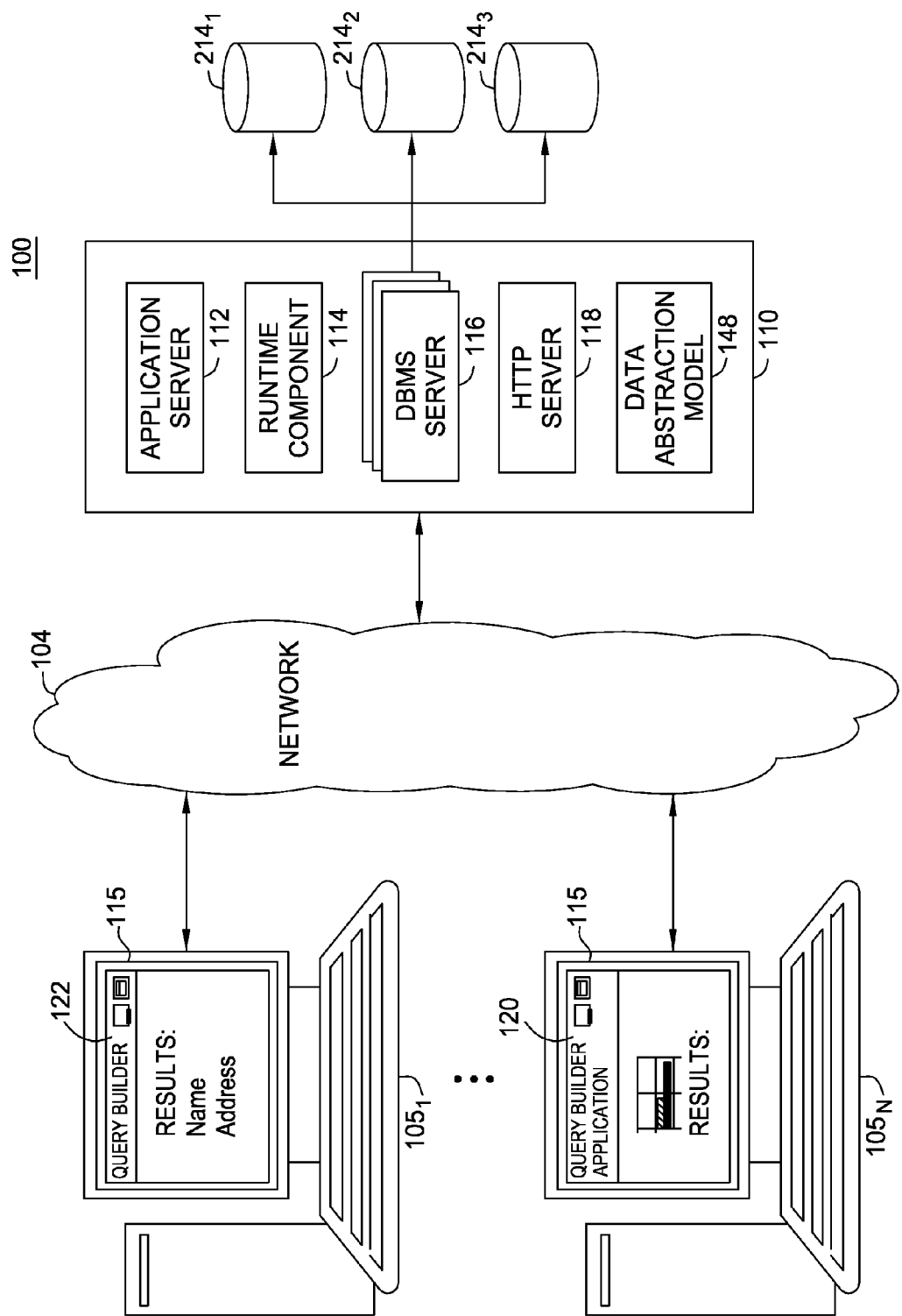
FIG. 1 illustrates an exemplary computing and data communications environment, according to one embodiment of the invention.

Embodiments of the invention allow for an SQL statement to be used in an abstract query based relational database environment. The mapping from a column in an SQL based statement to an abstract query field could be obtained through user input or by analyzing the SQL statement. The physical columns in the SQL statement are mapped to elements in the abstract query based database.

In one embodiment the output of an existing query (for example, the result columns of a SQL statement) may be exposed through the data abstraction model in different ways. First, output columns may include data already provided by existing logical fields, sharing the same name and the same meaning. However, in some other cases, the output columns may share the same names as existing logical fields but have different meanings. In such a case, replacement fields are generated which map to the output columns of the query being exposed. At runtime, the user can decide whether to use the "base" data abstraction model, or to use the replacement fields. That is, the user may choose to access a data abstraction model (DAM) which includes the integrated external query. Lastly, the output columns of the external query may include columns not present in the DAM. In such a case, new logical fields mapping to these columns may be created. In this way, the external query may be exposed through the data abstraction model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The Data Abstraction Model: Physical View of the Environment.

FIG. 1 illustrates a networked computer system 100 using a client-server configuration, according to one embodiment of the invention. Each client computer system $105_{1-N}$ includes a network interface that enables communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105, (e.g., a Linux® distribution, Microsoft Windows®, IBM's AIX® or OS/400®, FreeBSD, and the like). ("Linux" is a registered trademark of Linus Torvalds in the United States and other countries.)

The server system 110 may include hardware components similar to those used by client system 105. Accordingly, the server system 110 generally includes a CPU, a memory and a storage device, coupled by a bus (not shown). Like each client 105, server system 110 is also running an operating system.

The client-server configuration illustrated in FIG. 1, however, is merely exemplary of one hardware and software configuration. Embodiments of the present invention may be implemented using other configurations, regardless of whether the computer systems are complex multi-user computing systems, such as a cluster of individual computers connected by a high-speed network, single-user workstations or network appliances lacking non-volatile storage. Additionally, although FIG. 1 illustrates computer systems using client and server architecture, embodiments of the invention may be implemented in a single computer system, or in other configurations, including peer-to-peer, distributed, or grid architectures.

In one embodiment, users interact with the server system 110 using a graphical user interface (GUI) provided by query building interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and the application 120 may be configured to allow a user to compose an abstract query, and to submit the query to the runtime component 114.

As illustrated in FIG. 1, server system 110 may further include runtime component 114, DBMS server 116 and data abstraction model 148. In one embodiment, these components may be provided as software applications executing on the server system 110. DBMS server 116 includes a software application configured to manage databases $214_{1-3}$. That is, the DBMS server 116 communicates with the underlying physical database system, and manages the physical database environment behind the data abstraction model 148. In one embodiment, users interact with the query interface 115 to compose and submit an abstract query to the runtime component 114 for processing. In turn, the runtime component 114 receives an abstract query and, in response, generates a query of underlying physical databases 214.

In one embodiment, the runtime component 114 may be configured to generate a query (e.g., an SQL statement) from an abstract query. Typically, users compose an abstract query from the logical fields defined by the data abstraction model 148, and the runtime component 114 may be configured to use the access method defined for a logical field 208 when generating a query of the underlying physical database (which may be referred to as a "resolved," "executable" or "physical" query) from an abstract query. Logical fields, access methods and physical data field substitution are described in greater detail below. Additionally, the runtime component 114 may also be configured to return query results to the requesting entity, (e.g., using HTTP server 118, or equivalent).

The Data Abstraction Model: Logical View of the Environment

Figure 2A:
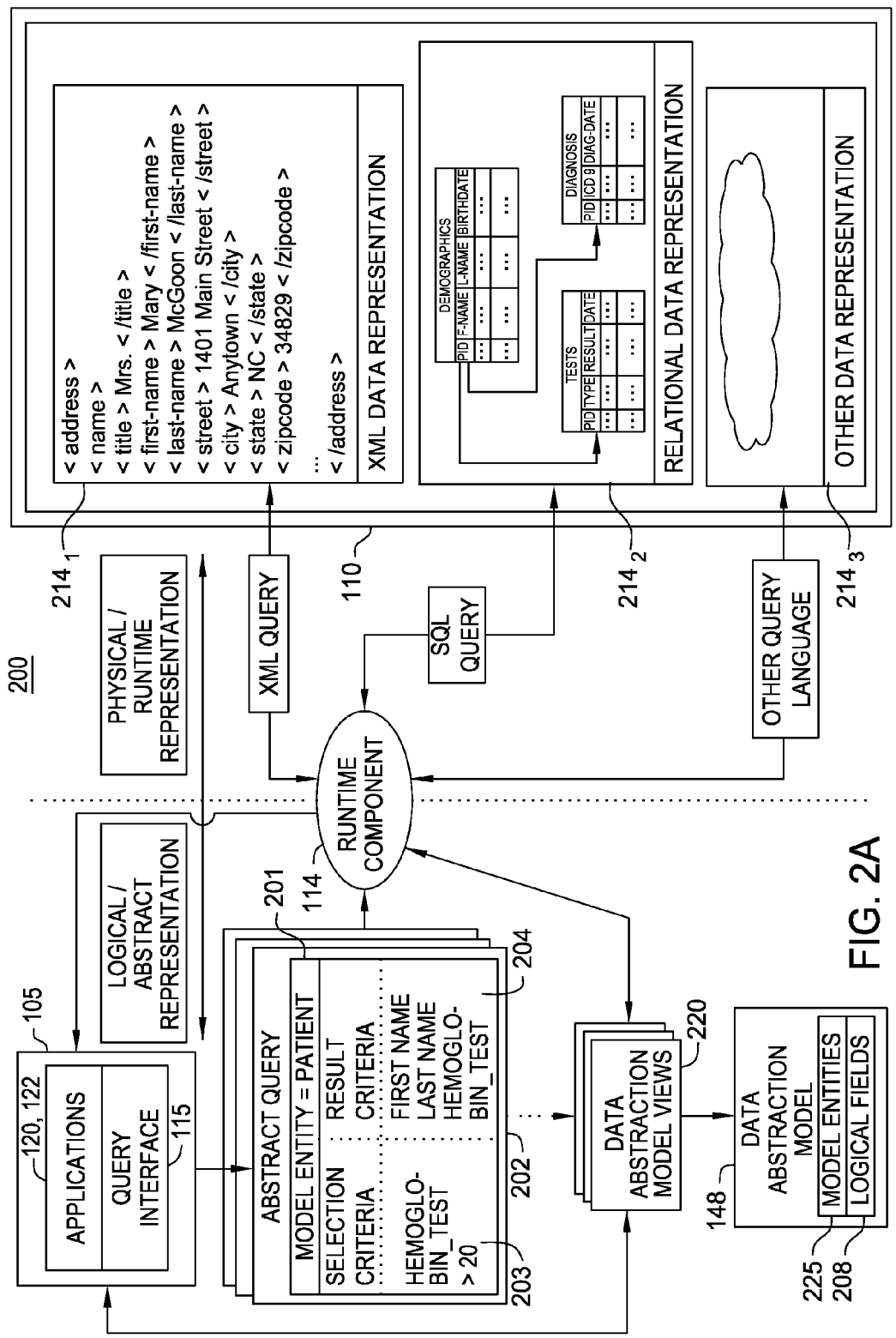
FIG. 2A illustrates a logical view of the data abstraction model configured to access data stored in an underlying physical database, according to one embodiment of the invention.

FIG. 2A is a functional block diagram illustrating interrelated components of a computer system 200 implementing an embodiment of the invention, and also illustrates the relationship between the logical view of data provided by the data abstraction model components (the left side of FIG. 2A), and the underlying physical database components (the right side of FIG. 2A).

In one embodiment, the data abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient," a "person," an "employee," a "test," a "facility," etc.). Programming language based queries, such as SQL queries, are different from abstract queries because programming language based queries are based on direct references to data structures in the underlying physical database 214.

For example, abstract query 202 includes an indication that the query is directed to instances of the "patient" model entity 201, and further includes selection criteria 203 that includes the conditions "hemoglobin_test>40." The selection criteria 203 are composed by specifying a condition evaluated against the data values corresponding to a logical field 208 (in this case the "hemoglobin_test" logical field). The operators in a condition typically include comparison operators such as =, >, <, >=, or, <=, and logical operators such as AND, OR, and NOT. Results criteria 204 indicates that the data retrieved for instances of the model entity that satisfy the selection criteria 203 should include data from the "name," "age" and "hemoglobin_test" logical fields 208.

The definition for each logical field 208 specifies an access method for accessing data at a particular location in the underlying physical database 214. The particular location may be specified in the logical field definition as, for example, a table name and a column name. In other words, the access method (and corresponding location information) defined for a logical field provides a mapping between the logical view of data exposed to a user interacting with the interface 115 and the physical view of data used by the runtime component 114 to retrieve data from the physical databases 214. In a particular embodiment, the access method describes how the data at the specified location is to be exposed. Accordingly, a variety of different access method types are contemplated, as will be described below. For brevity, reference to an "access method" may refer to the specification of a particular type of access method in a logical field definition, as well as the corresponding location information.

In one embodiment, which logical fields 208 are available to use in query operations may be determined by one of the data abstraction model views 220. The abstraction model views 220 provide an access control mechanism for the underlying logical fields 208. In one embodiment, each data abstraction model view 220 includes a set of instructions to remove or redefine fields in the abstraction model 148 for a particular user, or group of users. With these instructions, any field in the abstraction model can be removed or redefined. Further, this may occur in a cascading fashion, e.g., where a logical field that depends upon a removed field will itself be removed from the view exposed by a particular data abstraction model view 220.

Additionally, the data abstraction model 148 may define a set of model entities 225 that may be used as the focus, or central concept, for an abstract query 202. In one embodiment, users select which model entity to query as part of the query composition process. Model entities are described below, and further described in commonly assigned, U.S. Pat. No. 7,054,877, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

An illustrative abstract query, corresponding to abstract query 202, is shown in Table I below. In this example, the abstract query 202 is represented using eXtensible Markup Language (XML). In one embodiment, query building interface 115 may be configured to generate an XML document to represent an abstract query composed by a user. Those skilled in the art will recognize that XML is a well known markup language used to facilitate the sharing of structured text and information. However, other markup languages or data representation techniques may be used.

TABLE I

Query Example

| | |
|---|---|
| 001 | <?xml version="1.0"?> |
| 002 | <!--Query string representation: ("Hemoglobin_test > 20") |
| 003 | <QueryAbstraction> |

TABLE I-continued

Query Example

```
004        <Selection>
005            <Condition>
006                    field="Hemoglobin Test" operator="GT"
                        value="40"
007            </Condition>
008        </Selection>
009        <Results>
010                    <Field name="Name"/>
011                    <Field name="Age"/>
012                    <Field name="hemoglobin_test"/>
013        </Results>
014        <Entity name="patient" >
015                    <FieldRef name="data://patient/PatientID" >
016                        <Usage type="query" />
017                    </FieldRef>
018        </Entity>
019    </QueryAbstraction>
```

The XML markup shown in Table I includes the selection criteria 203 (lines 004-008) and the results criteria 204 (lines 009-013). Selection criteria 203 includes a field name (for a logical field), a comparison operator (=, >, <, etc.) and a value expression (what the field is being compared to). In one embodiment, the results criteria 204 include a set of logical fields for which data should be returned. The actual data returned is for instances of the model entity with data consistent with the selection criteria 203. Line 17 identifies the model entity selected by a user, in this example, a "patient" model entity 201. Line 18 indicates the identifier in the physical database 214 used to identify instances of the model entity. In this case, instances of the "patient" model entity are identified using values from the "Patient ID" column of a patient table.

After composing an abstract query 202 a user may provide it to runtime component 114 for processing. The runtime component 114 may be configured to process the abstract query 202 by generating an intermediate representation, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in the abstract query, and further identify how to join columns of data together. The runtime component may then parse the intermediate representation in order to generate a physical query of the underlying physical database (e.g., an SQL statement (or statements) executed against database $214_2$)). Abstract query plans and query processing techniques are further described in a commonly assigned U.S. Pat. No. 7,461,052 entitled "Abstract Query Plan," which is incorporated by reference herein in its entirety.

The Data Abstraction Model: Logical Fields

Figure 2B:
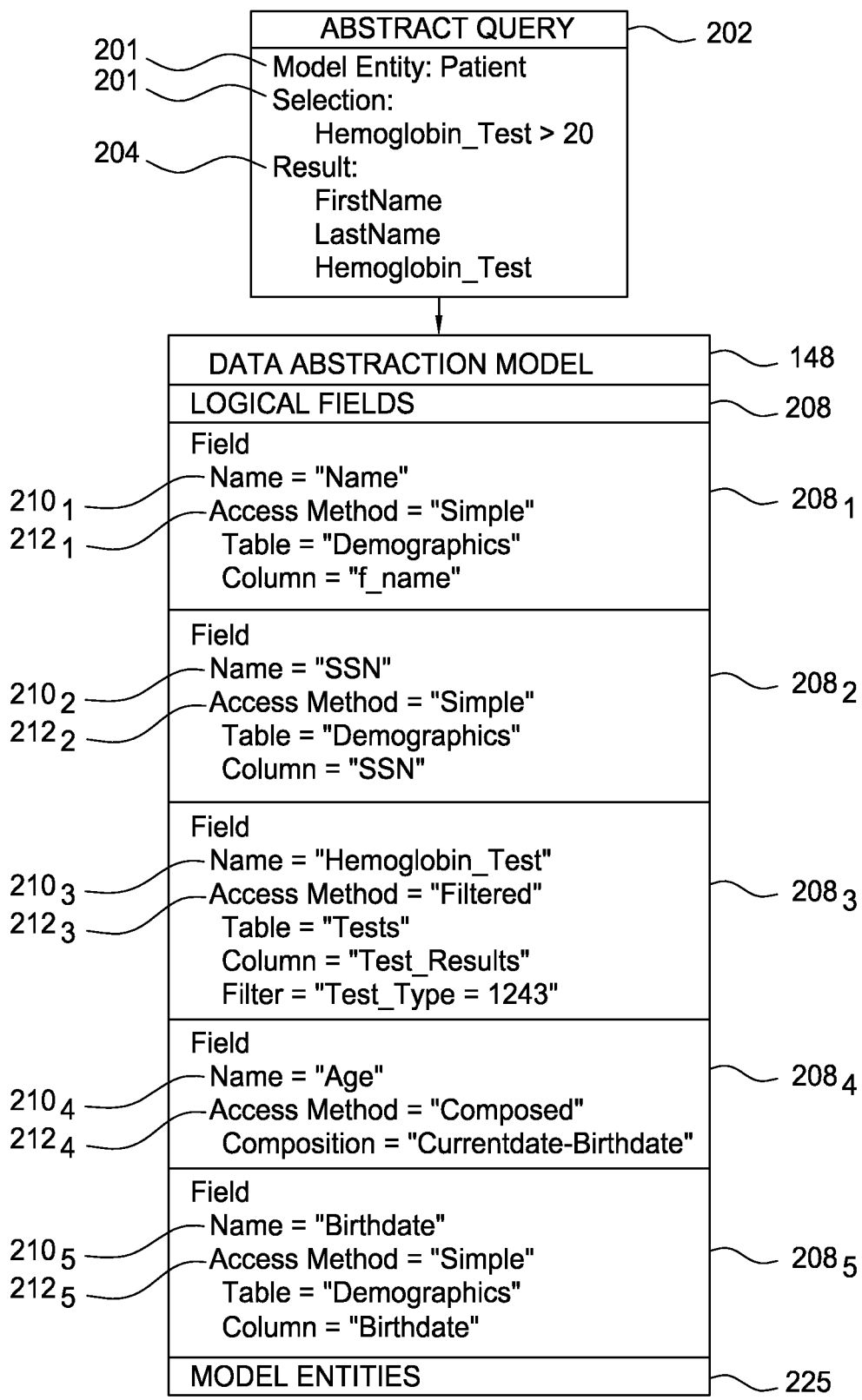
FIGS. 2B-2C further illustrates a data abstraction model, according to one embodiment of the invention.

FIG. 2B illustrates abstract query 202 along with an embodiment of a data abstraction model 148 using a plurality of logical field specifications $208_{1-5}$ (five shown by way of example). The access methods included in the logical field specifications 208 map these logical fields 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access method types may be supported by the data abstraction model 148. FIG. 2B illustrates access methods for simple fields, filtered fields, and composed fields. Each of these three access method types are described below.

A simple access method specifies a direct mapping to a particular entity in the underlying physical database. Field specifications $208_1$, $208_2$, $208_5$ and $208_6$ each provide a simple access method, $212_1$, $212_2$, $212_5$ and $212_6$ respectively. For a relational database, the simple access method maps a logical field to a specific database table and column. For example, the simple field access method $212_1$ shown in FIG. 2B maps the logical field name $210_1$ "Name" to a "name" column in a "Demographics" table. Similarly, $208_2$, $208_5$ and $208_6$ map to other tables and columns of an underlying physical database.

Logical field specification $208_3$ exemplifies a filtered field access method. Filtered access methods identify an associated physical database and provide rules that define a particular subset of items within the underlying database that should be returned for the filtered field or used for comparison purposes. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data from rows of a table that satisfies the filter are returned for this logical field, or used to evaluate a query condition. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be determined and provided to a user. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. In addition, more complex logical fields may be defined by combining the simple, filtered and composed access method types. For example, a composed field may include a filter.

By way of example, the specifications provided for the logical fields 208 illustrated in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A). Further, in one embodiment, the data abstraction model 148 is stored on computer system 110 using an XML document that describes the model entities, logical fields, access methods and additional metadata that, collectively, define the data abstraction model 148 for a particular physical database system. Other storage mechanisms or markup languages, however, are also contemplated.

The Data Abstraction Model: Model Entities

Figure 2C:
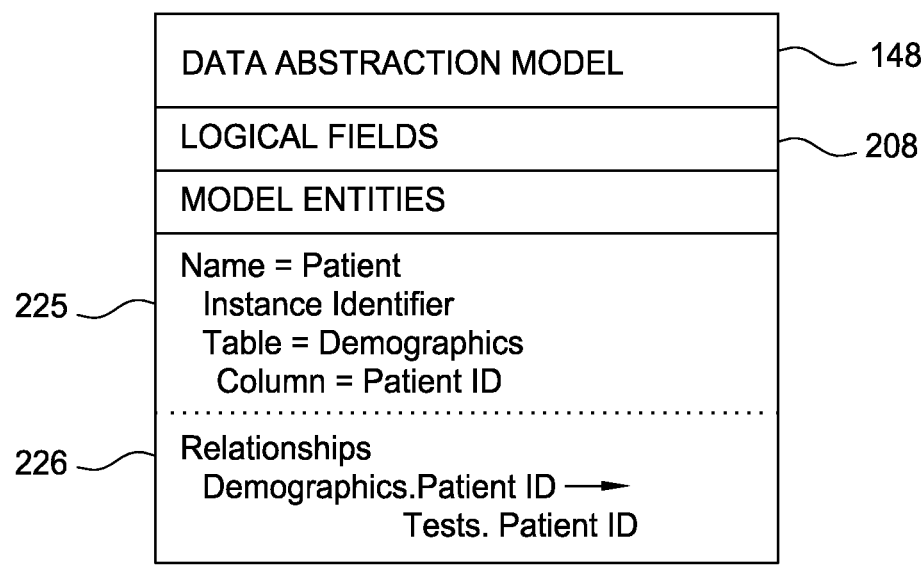

FIG. 2C further illustrates the exemplary data abstraction model 148. In addition to logical fields 208, the data abstraction model 148 may include model entity definitions 225. FIG. 2C illustrates a definition for the "patient" model entity first illustrated in FIGS. 2A and 2B. In one embodiment, the conditions included in an abstract query are evaluated against instances of the model entity in the underlying database. As illustrated, model entity definition 225 includes a model entity name, model entity relationships, paths to related model entities, and path categories. Relationships 226 of one model entity with other model entities are also provided in one embodiment.

Illustratively, the "patient" model entity 225 is defined with a name (for the model entity, e.g., "patient") and an instance identifier used to distinguish between instances of the patient model entity. In this example, instances of the "patient" model entity are identified using values from the "patient ID" column of a demographic table in the physical database 214.

Figure 3:
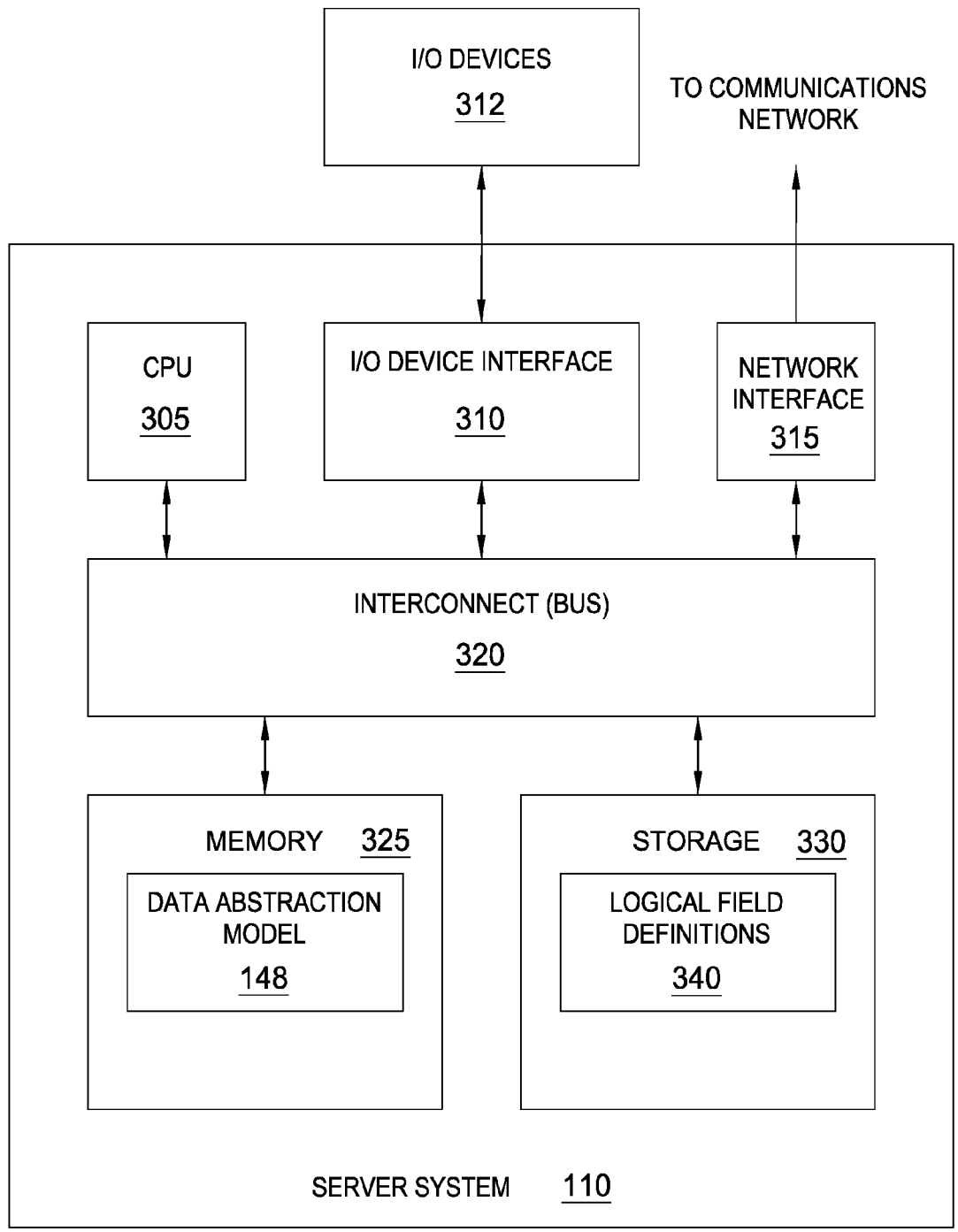
FIG. 3 illustrates a server system configured to implement a data abstraction model and to store logical field definitions, according to one embodiment of the invention.

FIG. 3 is a detailed view of the server system 110 of FIG. 1, according to one embodiment of the invention. As shown, server system 110 includes, without limitation, a central processing unit (CPU) 305, a network interface 315, an interconnect (bus) 320, a memory 325, and storage 330. The server system 105 may also include an I/O device interface 310 connecting I/O devices 312 (e.g., keyboard, display and mouse devices) to the server computing system 105.

In one embodiment, the client system 105 accesses the server system 110 to obtain data stored in the database 214, which is accessed via data abstraction model 148. As described above, the data abstraction model 148 is constructed using logical fields that map to data stored in the underlying physical database. In one embodiment, the definition for each logical field includes an access method specifying a location (i.e., a table and column) in the underlying database from which to retrieve data. The memory 325 of the server system 110 comprises the data abstraction model 148. The components of the data abstraction model 148 are illustrated in more detail in FIG. 4, which is described below.

As shown, the storage 330 includes logical field definitions 340. The logical field definitions define the data that is accessed via the logical fields in data abstraction model 148.

Exposing a Physical Query Through a Data Abstraction Model

Figure 4:
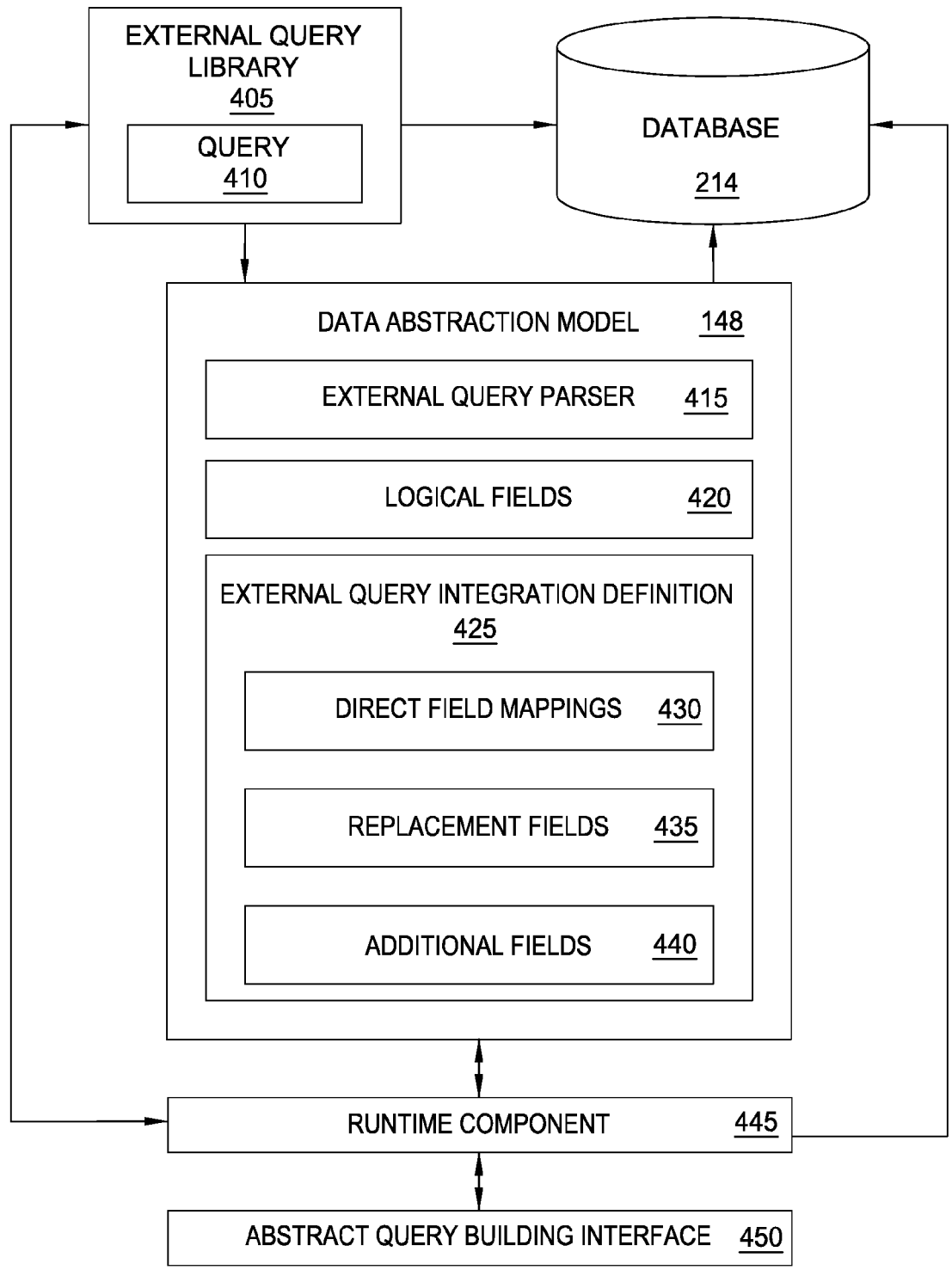
FIG. 4 provides a detailed view of a data abstraction model in a logical field abstract query based database system configured to accept external SQL queries, according to one embodiment of the invention.

FIG. 4 illustrates data abstraction model, extended to support physical statement structures (e.g., external SQL queries), according to one embodiment of the invention. In one embodiment, the data abstraction model 148 accesses a query 410 from an external query library 405. The query 410 may be configured to access data from a database 214. In one embodiment, the query is part of an external query library 405, which may provide a set of queries specifically tuned to access data in database 214. For example. A given enterprise may have spent extensive time and resources to carefully create, manage, and tune a set of queries used to provide information to individuals within the enterprise. Alternatively, however, a user may compose an external query, e.g., an SQL query, to be exposed through the data abstraction model 148. Such a query may then be stored in the external query library 405. In either case, the external query statement (i.e., query 410) may be exposed through an external query integration definition 425, which specifies logical fields mapping to the output columns of the external query statement.

An external query parser 415 parses the external query statement (i.e., query 410) to generate logical fields that represent the output columns of the external query statement. The logical fields for a given external query are specified by the resulting external query integration definition 425. For example, the external query integration definition 425 may include direct field mappings 430, replacement fields 435 and additional fields 440. Direct field mappings 430 provide a mapping from an output column in the external query statement (i.e., query 410) to one of the logical fields 420 in the data abstraction model. That is, the external query statement may include output columns that correspond to logical fields which are already present in the data abstraction model. In such a case, there is no need to create new logical fields to represent such output columns. Instead, the external query integration definition 425 includes direct field mappings 430 used to map the relevant output columns of the external query to the appropriate logical field 420 in the data abstraction model 148. Thus, when a user desires to compose an abstract query that relies on (e.g., as selection criteria or results data) such an output column, the existing logical field may be used.

In contrast, some output columns of the query statement may syntactically match existing logical fields, but provide a different semantic meaning. That is, while the output column of the external query may share a name with an existing logical field, the data stored in the output column when the external query is executed does not match what data values are accessed using the existing logical field with the matching name. In such a case, the external query integration definition 235 may provide a replacement logical field 435 that maps to the output column of the external query statement, when that statement is exposed through the data abstraction model 148. Doing so allows a user to compose an abstract query that maps to the output column of the query using the replacement logical field 435.

Lastly, some output columns generated when the external query statement is executed may simply not be present in the data abstraction model 148. Accordingly, additional fields 440 provide logical fields added to the data abstraction model 148 to represent output columns of the external query statement not otherwise present in the data abstraction model 148 (at least when the external query statement is being exposed through the data abstraction model 148). Direct field mappings 430, replacement fields 435 and additional fields 440 are discussed in more detail in relation to FIG. 6 below.

Figure 5:
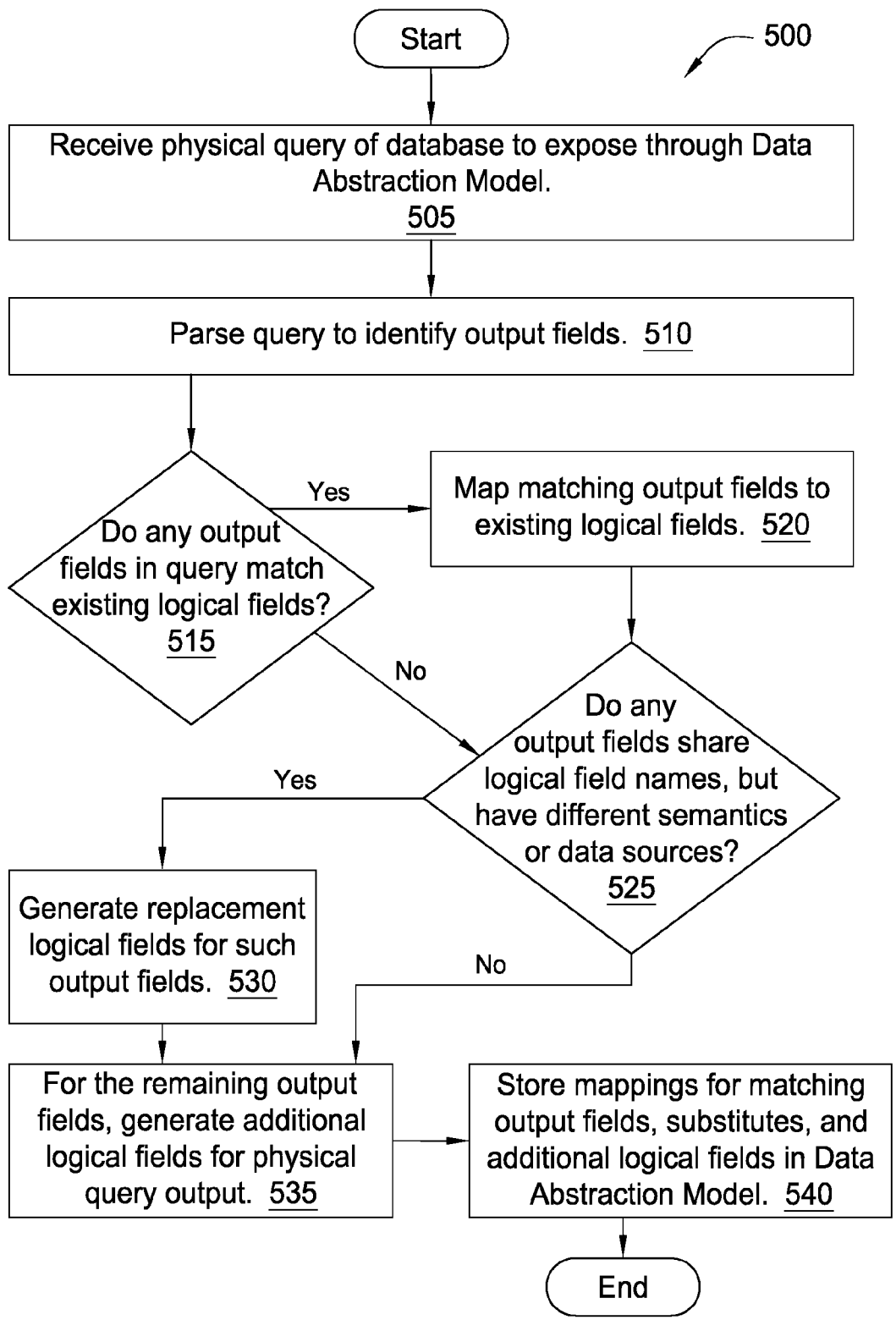
FIG. 5 is a flowchart for a method for exposing a physical query through a data abstraction model, according to one embodiment of the invention.

FIG. 5 illustrates a method 500 of exposing a physical query through a data abstraction model, according to one embodiment of the invention. The method begins by receiving a physical query of a database (step 505). Such a query may be written in any programming query language configured to access databases, such as SQL. In step 510, the external query parser may parse the received query to identify the output columns created when the query statement is executed. If the query is in a programming language, such as SQL, rather than in a logical field abstract query based format, the processor could determine the names of the output fields by looking at the table and column names in the SQL command.

The processor then determines whether any output fields in the query match logical fields (step 515) already defined by the data abstraction model. In one embodiment, this determination is completed by comparing the logical field definitions with the identifiers (e.g., column or table names) specifying the output columns in the query. If output columns in the query match existing logical fields, then the external query parser generates a mapping to link the matching output fields to the existing logical fields (step 520).

At step 525, the external query parser determines whether any output fields share logical field names, but have different semantics or data sources. If so, the external query parser generates replacement logical fields for output fields that have different semantics or data sources (step 530). For the remaining output columns, the processor generates additional logical fields for the physical query output (step 535). At step 540, the processor stores mappings for matching output fields, replacement logical fields, and additional logical fields in the data abstraction model (step 540). Further, once exposed queries become part of the data abstraction model, users may compose abstract queries that map to the output columns of the exposed query statement using the mapped, replaced, and additional logical fields. In one embodiment, when the user includes replacement or additional logical fields in an abstract query, the runtime component then includes the external query statement in the resolved query generated from the abstract query. Note that, when an abstract query includes the mapped logical fields, the external query need not be executed. However, the mappings may allow for certain joins to be performed (joining data from the external query output to other tables in the underlying schema or SQL query results).

Figure 6:
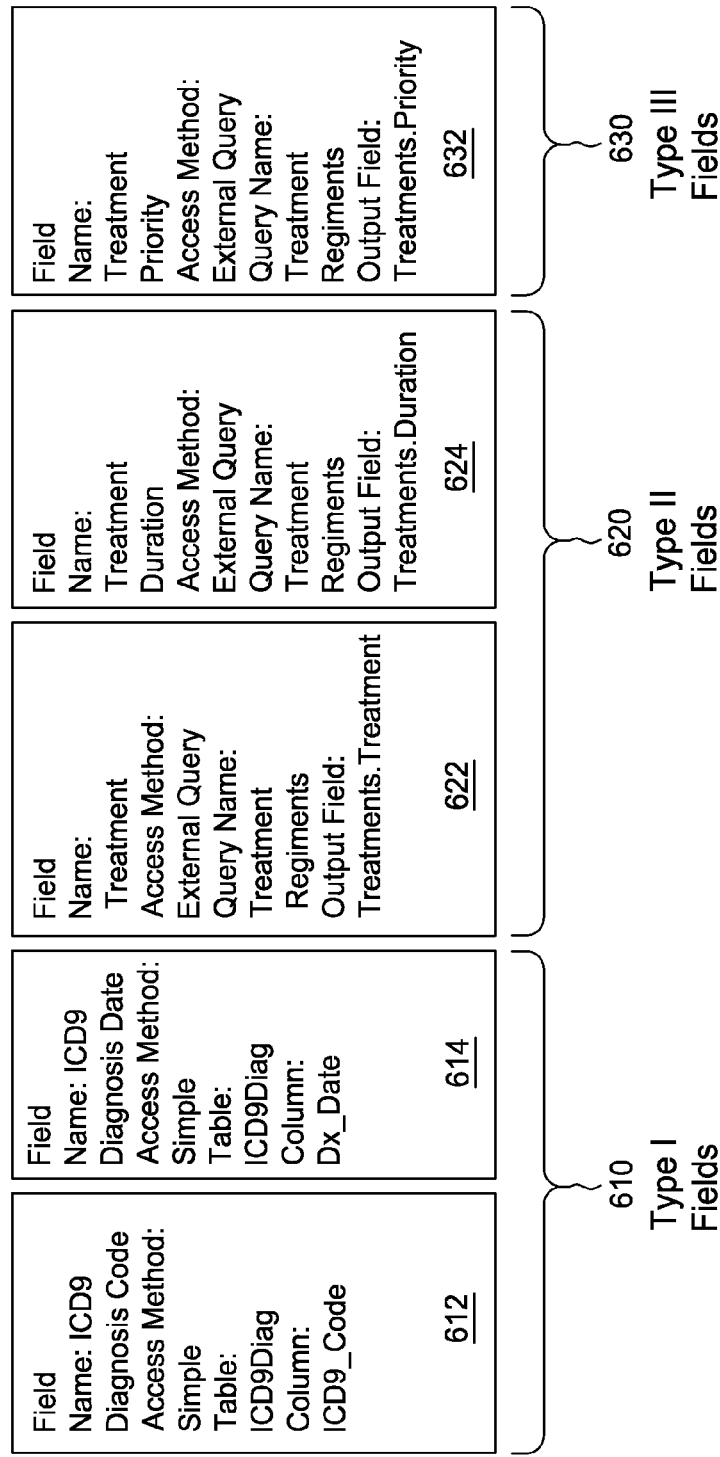
FIG. 6 illustrates an example of logical fields derived from an SQL statement, according to one embodiment of the invention.

FIG. 6 illustrates an example of logical fields derived from an SQL statement, according to one embodiment of the invention. More specifically, FIG. 6 illustrates an example of an SQL statement 600, with output columns exposed through the data abstraction model using Type I, Type II and Type III logical fields. In this example, Type I fields correspond to direct field mappings discussed above. Further, Type II fields correspond to replacement fields and Type III fields correspond to additional logical fields generated to expose an external query statement through the data abstraction model, also discussed above. Table II, below, illustrates the output fields of SQL statement 600.

TABLE II

Physical definitions of concepts/fields

| Line | Logical Field | Physical Definition |
| --- | --- | --- |
| 001 | ICD9 Diagnosis | ICD9DIAG.ICD9_CODE |
| 002 | Date of ICD9 Diagnosis | ICD9DIAG.DX_DATE |
| 003 | Patient Treatment | Treatments.Treatment |
| 004 | Duration of Patient Treatment | Treatments.Duration |

SQL statement 600 retrieves data from a plurality of columns from an example database table named "ICD9DIAG.Treatments." The columns to be selected are divided in to Type I fields 610, Type II fields 620, and Type III fields 630.

Type I fields 610 are output columns of the query statement that can be mapped directly to logical fields in the data abstraction model 148. Thus, these output columns are already exposed through the data abstraction model 148, so all that is necessary is a mapping of the existing field name to a logical field name. As shown, Type I fields 610 include an ICD9 diagnosis code field 612 (line 001 of Table II) and the ICD9 diagnosis date field 614 (line 002 of Table II). As shown in Table II, the ICD9 diagnosis code and diagnosis date are stored directly in tables of the database.

The mapping of Type I fields may be used to maintain to relationships between the output columns of the query statement 600 when performing SQL joins between the physical query generated by data abstraction model and the output columns of the imported physical query statement (i.e., query statement 600). That is, the behavior of the Type I fields 610 within the query statement 600, is that the Type I fields 610 are used to create a relationship between data referenced in the data abstraction model 148 and the data returned from the SQL query 600. As shown in FIG. 2C, e.g., the data abstraction model 148 currently is shown with one relationship 226 between Demographics.PatientID and Tests.Patient ID (for a "patient" model entity). However, when the user logs in (e.g., as shown in login screen of FIG. 7) and selects the "Treatment Regimens" application 734, the DDQB engine creates additional relationship using the mapping of Type I fields 610 in the SQL query 600. In this example, the relationship would be from the base table and column associated with the Type I fields 612, 614 to the columns for the Type I fields 612, 614 from the SQL query statement 600. For example, a new relationship may be added to the data abstraction model 148. Such a relationship links the ICD9 Diag table to the TreatmentRegimentsSQL output as follows:

ICD9Diag.ICD9_Code → TreadmentsRegimentsSQL.ICD9_Code
ICD9Diag.Date → TreatmentsRegimentsSQL.DX_Date Doing so allows SQL joins in the generated physical part of the query to be performed when the user uses existing fields in the DAM (any of 208 or Type I fields 612, 614) as well as any of the Type II or Type III fields which come from the physical query 600.

As noted, Type II fields 620 correspond to replacement logical fields. Accordingly, Type II fields 620 are generated for output columns of the query statement 600 which match some logical field in the data abstraction model (e.g., where an output column name matches an existing logical field), but do not match the underlying semantics (or data source location) of the matching logical fields. In this example, Type II fields 620 generated from query 600 include the treatment field 622 (line 003 of Table II) and the treatment duration field 624 (line 004 of Table II). As shown in query 600, values for the "treatments.treatment" and "treatments.duration" output columns are generated by executing the "treatments.regiments" query, i.e., by executing SQL statement 600. In this example, assume that the data abstraction model includes a "treatment" logical field and a "duration" logical field, but that these logical fields map to database tables that store records of historical treatments (and treatment durations) given to patients in the past. In contrast, the treatments and treatment duration columns output by SQL statement 600 provide prospective recommendations for treating a patient. As a result, these output columns cannot be mapped to existing logical fields and neither can new logical fields be created for these columns without creating a namespace conflict with the "treatment" logical field and "duration" logical fields.

Accordingly, in one embodiment, the external query parser generates replacement fields (fields 622 and 624) used when query 600 is exposed to users through the data abstraction model. Specifically, fields 622 and 624 include an access method specifying SQL statement 600 by name "treatment.regiments," as well as specify which columns of query 600 correspond to the logical fields 622 and 624.

Lastly, Type III fields are generated to represent output columns returned by SQL statement 600 which are not present in the underlying database (or which match any existing logical fields). In this example, the treatment priority logical field 632 corresponds to the output column of "treatments.priority" in SQL statement 600. When logical field 632 is included in an abstract query, the SQL statement 600 is executed (as indicated by the access method of "external query" referencing the "Treatments priority" query in logical field 632). Doing so provides an output table with the "treatments.priority column" used to supply underlying data values for this logical field.

Figure 7:
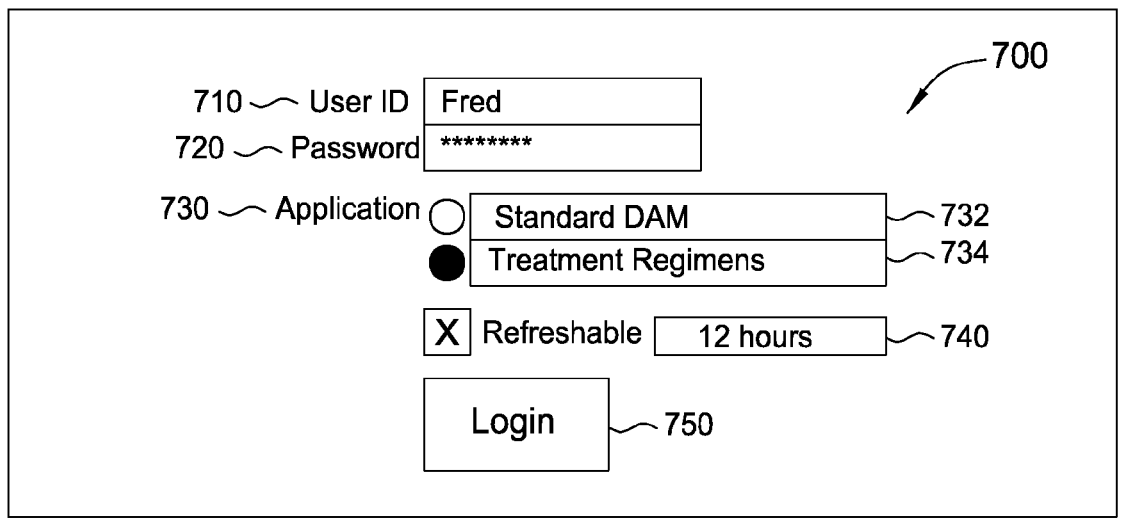
FIG. 7 illustrates an example interface where the user can select to use either a standard data abstraction model or a data abstraction model with external query integration, according to an embodiment of the invention.

FIG. 7 illustrates an exemplary login screen 700, according to an embodiment. The login screen prompts the user to enter her user ID 710 and password 720. At block 730, the user can select whether to use the standard data abstraction model (DAM) 732 or to expose the treatment regimens SQL query (i.e., query 600) through the data abstraction model 734. The selection could be made via radio buttons, as illustrated. Alternatively, other graphical interface elements could be used (e.g., a drop-down menu used to select between multiple external queries). At block 740, the user can select whether she wants the data to be refreshable based on updates to the SQL statement and how frequently to refresh the SQL statement (e.g., once every 12 hours). In one embodiment, this selection is made via a check box. Finally, a login button 750 is provided for the user to click after she has completed filling out all of the information requested on the login screen.

Figure 8:
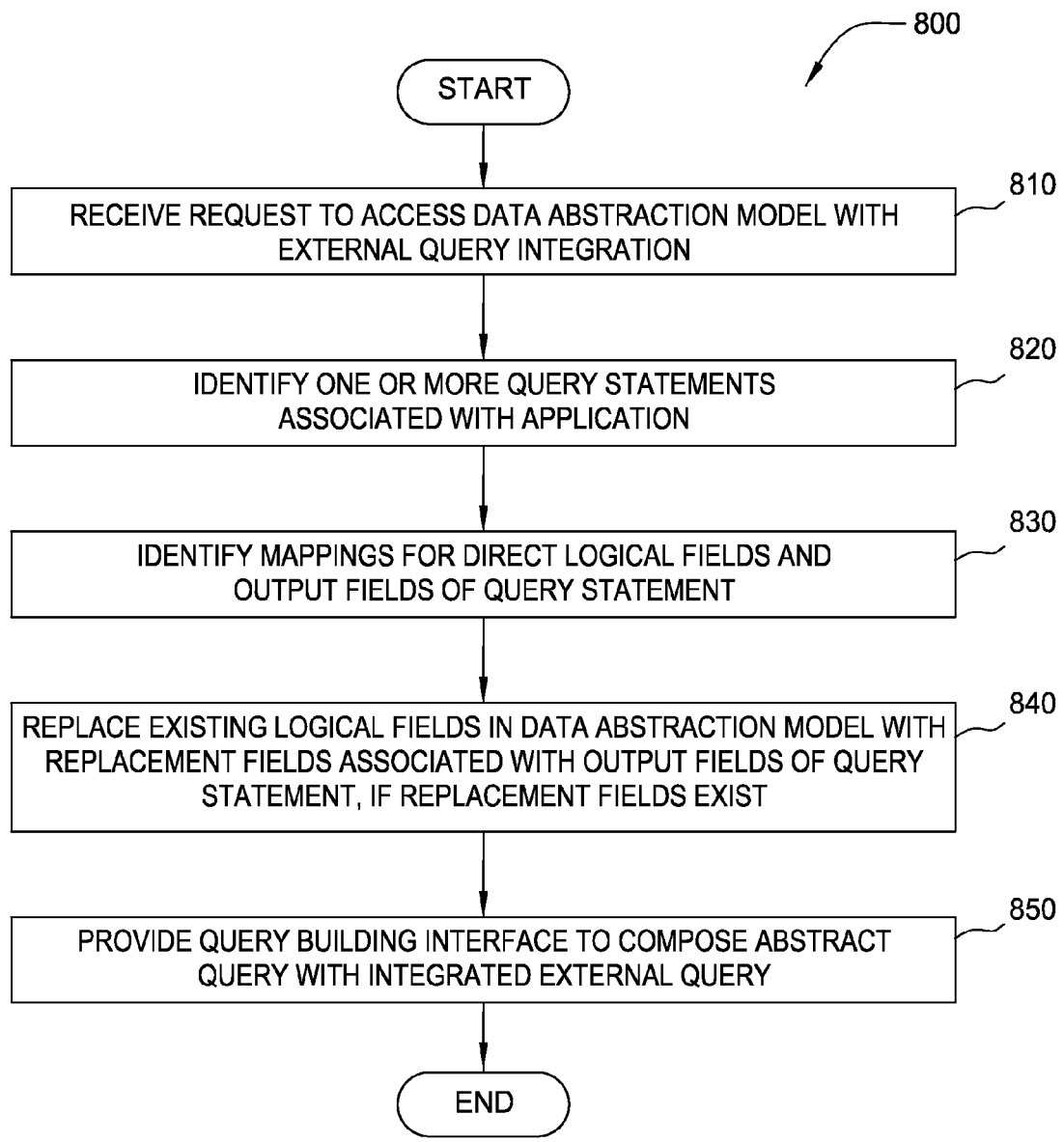
FIG. 8 illustrates a method of processing a request to access a data abstraction model with external query integration, according to an embodiment of the invention.

FIG. 8 illustrates a method 800 for processing a request to access a data abstraction model with external query integration, according to one embodiment of the invention. In step 810, the runtime component of the data abstraction model receives the request, e.g., from a user interacting with a login screen. In one embodiment, the login screen is provided in a web browser 122 or a query builder application 120. As noted, the user may specify to extend a "base" data abstraction model with a specified external query (e.g., query statement 600). In step 820, the runtime component of the data abstraction model identifies one or more query statements associated with the application. Once identified, at step 830, the runtime component of the data abstraction model may identify mappings for direct logical fields (Type I fields 610). In step 840, the runtime component of the data abstraction model replaces existing logical fields in the data abstraction model with replacement logical fields associated with output columns of query statements (i.e., with Type II logical fields 620). In step 850, the runtime component of the data abstraction model provides a query building interface to compose an abstract query with logical fields which expose the output columns of the integrated external query.

Advantageously, embodiments of the invention allow for an SQL statement to be integrated in a logical field abstract query database environment. The columns of the SQL statement are mapped to the logical fields in the database. The output of an existing query (for example, the result columns of a SQL statement) may be exposed through the data abstraction model in different ways. First, output columns may include data already provided by existing logical fields. However, in some other cases, the output columns may share the same names as existing logical fields but have different meanings. In such a case, replacement fields are generated which map to the output columns of the query being exposed. At runtime, the user can decide whether to use the original data abstraction model, without external query integration, or to use the replacement fields. That is, the user may choose to access a data abstraction model (DAM) which includes the integrated external query. Lastly, the output columns of the external query may include columns not present in the DAM. In such a case, new logical fields mapping to these columns may be created. In this way, the external query may be exposed through the data abstraction model.

While the foregoing is directed to embodiments of the present invention, other and further embodiments of the invention may be devised without departing from the basic scope thereof, and the scope thereof is determined by the claims that follow.

What is claimed is:

1. A computer-implemented method of integrating a physical query statement in a data abstraction model comprising a first plurality of logical fields used to expose an underlying physical database, the method comprising:

parsing the physical query statement to identify a plurality of output fields specified by the physical query statement;

upon determining that a first output field of the identified plurality of output fields has a corresponding logical field, of the first plurality of logical fields, mapping the first output field of the physical query statement to the corresponding logical field provided by the data abstraction model;

upon determining that a second output field of the identified plurality of output fields does not have any corresponding logical field, generating a second logical field mapping to the second output field, wherein the second logical field includes an access method mapping the second logical field to the second output field;

upon determining that a naming conflict exists between the second output field and one of the plurality of logical fields:

determining a second name to assign to the second logical field to resolve the determined naming conflict, wherein the second name is different from a first name; and adding the second logical field having the second name to the plurality of logical fields, wherein the naming conflict is resolved without having to replace any logical field in the data abstraction model; and upon determining that no naming conflict exists between the second output field and one of the plurality of logical fields:

determining a first name to assign to the second logical field; and adding the second logical field having the first name to the plurality of logical fields.

2. The method of claim 1, further comprising:

adding the generated second logical field to the plurality of logical fields; and providing a query interface to compose abstract queries.

3. The method of claim 1, wherein the second output field provides data values not exposed by any of the plurality of logical fields.

4. The method of claim 1, further comprising, providing a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

5. The method of claim 1, wherein the second logical field is generated without requiring any user input specifying to generate the second logical field mapping to the second output field.

6. The method of claim 5, wherein the second output field provides data values not exposed by any of the plurality of logical fields, wherein the physical query statement is an SQL statement, the method further comprising:

providing a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

7. A non-transitory computer readable storage medium storing an application, which, when executed on a processor, performs an operation for integrating a physical query statement in a data abstraction model comprising a first plurality of logical fields used to expose an underlying physical database, the operation comprising:

parsing the physical query statement to identify a plurality of output fields specified by the physical query statement;

upon determining that a first output field of the identified plurality of output fields has a corresponding logical field, of the first plurality of logical fields, mapping the first output field of the physical query statement to the corresponding logical field provided by the data abstraction model;

upon determining that a second output field of the identified plurality of output fields does not have any corresponding logical field, generating a second logical field mapping to the second output field, wherein the second logical field includes an access method mapping the second logical field to the second output field;

upon determining that a naming conflict exists between the second output field and one of the plurality of logical fields:

determining a second name to assign to the second logical field to resolve the determined naming conflict, wherein the second name is different from a first name; and adding the second logical field having the second name to the plurality of logical fields, wherein the naming conflict is resolved without having to replace any logical field in the data abstraction model; and upon determining that no naming conflict exists between the second output field and one of the plurality of logical fields:

determining a first name to assign to the second logical field; and adding the second logical field having the first name to the plurality of logical fields.

8. The computer-readable storage medium of claim 7, wherein the operation further comprises:

adding the generated second logical field to the plurality of logical fields; and providing a query interface to compose abstract queries.

9. The non-transitory computer readable storage medium of claim 7, wherein the second output field provides data values not exposed by any of the plurality of logical fields.

10. The non-transitory computer readable storage medium of claim 7, wherein the operation further comprises, providing a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

11. The non-transitory computer readable storage medium of claim 7, wherein the second logical field is generated without requiring any user input specifying to generate the second logical field mapping to the second output field.

12. The non-transitory computer readable storage medium of claim 11, wherein the second output field provides data values not exposed by any of the plurality of logical fields, wherein the physical query statement is an SQL statement, wherein the operation further comprises:

providing a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

13. A system, comprising:

a processor; and a memory storing an application program, which, when executed on the processor, performs an operation for integrating a physical query statement in a data abstraction model comprising a first plurality of logical fields used to expose an underlying physical database, the operation comprising:

parsing the physical query statement to identify a plurality of output fields specified by the physical query statement;

upon determining that a first output field of the identified plurality of output fields has a corresponding logical field, of the first plurality of logical fields, mapping the first output field of the physical query statement to the corresponding logical field provided by the data abstraction model;

upon determining that a second output field of the identified plurality of output fields does not have any corresponding logical field, generating a second logical field mapping to the second output field, wherein the second logical field includes an access method mapping the second logical field to the second output field;

upon determining that a naming conflict exists between the second output field and one of the plurality of logical fields:

determining a second name to assign to the second logical field to resolve the determined naming conflict, wherein the second name is different from a first name; and adding the second logical field having the second name to the plurality of logical fields, wherein the naming conflict is resolved without having to replace any logical field in the data abstraction model; and upon determining that no naming conflict exists between the second output field and one of the plurality of logical fields:

determining a first name to assign to the second logical field; and adding the second logical field having the first name to the plurality of logical fields.

14. The system of claim 13, wherein the operation further comprises:

adding the generated second logical field to the plurality of logical fields; and providing a query interface to compose abstract queries.

15. The system of claim 13, wherein the second output field provides data values not exposed by any of the plurality of logical fields.

16. The system of claim 13, wherein the operation further comprises, providing a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

17. The system of claim 13, wherein the second logical field is generated without requiring any user input specifying to generate the second logical field mapping to the second output field.

18. The system of claim 17, wherein the second output field provides data values not exposed by any of the plurality of logical fields, wherein the physical query statement is an SQL statement, wherein the operation further comprises:

provipding a query interface to compose abstract queries, wherein the query interface allows a user to select between composing an abstract query from a data abstraction model comprising the first plurality of logical fields and a data abstraction model comprising the plurality of logical fields, the first logical field, and the second logical field.

* * * * *